(12) United States Patent
Jeon et al.

(10) Patent No.: US 8,519,641 B2
(45) Date of Patent: Aug. 27, 2013

(54) APPARATUS FOR DRIVING LIGHT EMITTING DEVICE WITH OVER-CURRENT AND OVER-VOLTAGE PROTECTION

(75) Inventors: Peel Sik Jeon, Chungcheongnam-do (KR); Jae Han Yoon, Gyunggi-do (KR); Dong Kyun Ryu, Jeollabuk-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 442 days.

(21) Appl. No.: 12/963,295

(22) Filed: Dec. 8, 2010

(65) Prior Publication Data
US 2012/0013266 A1    Jan. 19, 2012

(30) Foreign Application Priority Data
Jul. 19, 2010  (KR) .................. 10-2010-0069502

(51) Int. Cl.
*H05B 37/02*    (2006.01)
(52) U.S. Cl.
USPC ........................ 315/308; 315/209 R
(58) Field of Classification Search
USPC ............ 315/209 R, 210, 291, 307, 308
See application file for complete search history.

(56) References Cited

U.S. PATENT DOCUMENTS

| | | | |
|---|---|---|---|
| 6,362,575 B1 * | 3/2002 | Chang et al. | 315/224 |
| 6,842,350 B2 * | 1/2005 | Yamada et al. | 363/21.16 |
| 2008/0018261 A1 * | 1/2008 | Kastner | 315/192 |
| 2011/0080109 A1 * | 4/2011 | Yang et al. | 315/291 |

FOREIGN PATENT DOCUMENTS

| | | |
|---|---|---|
| KR | 100148698 B1 | 5/1998 |
| KR | 1020000041545 A | 7/2000 |
| KR | 1020090090665 A | 8/2009 |

OTHER PUBLICATIONS

Office Action for KR10-2010-0069502 dated Sep. 20, 2011.

\* cited by examiner

*Primary Examiner* — Thuy Vinh Tran
(74) *Attorney, Agent, or Firm* — Lowe, Hauptman & Ham

(57) ABSTRACT

An apparatus for driving a light emitting part includes a DC/DC converter for supplying an amplified driving voltage to the light emitting part; a constant current circuit for controlling a current flowing through the light emitting part; a converter controller for controlling the DC/DC converter and the constant current circuit; a current sensor for sensing and converting a current flowing to an anode of the light emitting part into a voltage; a feedback controller for controlling a feedback current according to a magnitude of the voltage from the current sensor; an optical coupling part for performing optical coupling to transmit the feedback current as a feedback voltage; and a main controller for determining whether an over-current is occurring according to a magnitude of the feedback voltage and stopping an operation of the converter controller when the over-current is occurring.

9 Claims, 2 Drawing Sheets

APPARATUS FOR DRIVING LIGHT EMITTING DEVICE WITH OVER-CURRENT AND OVER-VOLTAGE PROTECTION

CROSS-REFERENCE TO RELATED APPLICATIONS

This application claims the priority of Korean Patent Application No. 10-2010-0069502 filed on Jul. 19, 2010, in the Korean Intellectual Property Office, the disclosure of which is incorporated herein by reference.

BACKGROUND OF THE INVENTION

1. Field of the Invention

The present invention relates to an apparatus for driving a light emitting device that is applied to a display device such as a light emitting diode (LED), and more particularly, to an apparatus for driving a light emitting device capable of protecting an internal circuit and components from over-current and over-voltage.

2. Description of the Related Art

A flat panel display includes a plasma display panel (PDP), a liquid crystal display (LCD), a light emitting diode (LED) or the like. In order to make these individual display devices slim, the internal circuits thereof are required to be light-weight, thin and small.

Such an LED display device includes a plurality of LEDs driven by a preset driving current.

However, in a case in which an LED chain including a plurality of LEDs has a central point inappropriately connected to a ground, the number of the LEDs included in the LED chain is reduced, thereby causing an over-current problem.

SUMMARY OF THE INVENTION

An aspect of the present invention provides an apparatus for driving a light emitting device capable of protecting an internal circuit and components from over-current and over-voltage.

According to an aspect of the present invention, there is provided an apparatus for driving a light emitting device, the apparatus including: a direct current/direct current (DC/DC) converter part amplifying a preset driving voltage and supplying the amplified driving voltage to a light emitting part including a plurality of light emitting devices; a constant current circuit part controlling a current flowing through the light emitting part; a converter controlling part controlling the DC/DC converter part and the constant current circuit part; a current sensing part sensing a current flowing to an anode of the light emitting part and converting the sensed current into a voltage; a feedback controlling part controlling a feedback current flowing from a standby terminal to a ground according to a magnitude of the voltage from the current sensing part; an optical coupling part performing optical coupling with respect to the feedback current determined by the feedback controlling part to transmit the feedback current as a feedback voltage; and a main controlling part determining whether an over-current is occurring according to a magnitude of the feedback voltage transmitted by the optical coupling part and stopping an operation of the converter controlling part when the over-current is occurring.

The current sensing part may include a sensing resistor connected to a power line between the DC/DC converter part and the anode of the light emitting part and sensing a voltage corresponding to the current flowing to the anode of the light emitting part; a current monitoring integrated circuit converting the voltage sensed by the sensing resistor into an output current; and a current/voltage converting part converting the output current of the current monitoring integrated circuit into an output voltage.

The feedback controlling part may include a first electronic device controlling the feedback current flowing from the standby terminal to the ground according to the magnitude of the voltage from the current sensing part.

The first electronic device may be a switching transistor.

According to another aspect of the present invention, there is provided an apparatus for driving a light emitting device, the apparatus including: a direct current/direct current (DC/DC) converter part amplifying a preset driving voltage and supplying the amplified driving voltage to a light emitting part including a plurality of light emitting devices; a constant current circuit part controlling a current flowing through the light emitting part; a converter controlling part controlling the DC/DC converter part and the constant current circuit part; a current sensing part sensing a current flowing to an anode of the light emitting part and converting the sensed current into a voltage; a voltage sensing part sensing at least one multi-voltage; a feedback controlling part controlling a feedback current flowing from a standby terminal to a ground according to a magnitude of the voltage from the current sensing part and a magnitude of the voltage from the voltage sensing part; an optical coupling part performing optical coupling with respect to the feedback current determined by the feedback controlling part to transmit the feedback current as a feedback voltage; and a main controlling part determining whether an over-current is occurring according to a magnitude of the feedback voltage transmitted by the optical coupling part and stopping an operation of the converter controlling part when the over-current is occurring.

The current sensing part may include a sensing resistor connected to a power line between the DC/DC converter part and the anode of the light emitting part and sensing a voltage corresponding to the current flowing to the anode of the light emitting part; a current monitoring integrated circuit converting the voltage sensed by the sensing resistor into an output current; and a current/voltage converting part converting the output current of the current monitoring integrated circuit into an output voltage.

The feedback controlling part may include a first electronic device controlling the feedback current flowing from the standby terminal to the ground according to the magnitude of the voltage from the current sensing part; and a second electronic device connected in parallel with the first electronic device and controlling the feedback current flowing from the standby terminal to the ground according to the magnitude of the voltage from the voltage sensing part.

The first electronic device may be a switching transistor.

The second electronic device may be a switching transistor.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
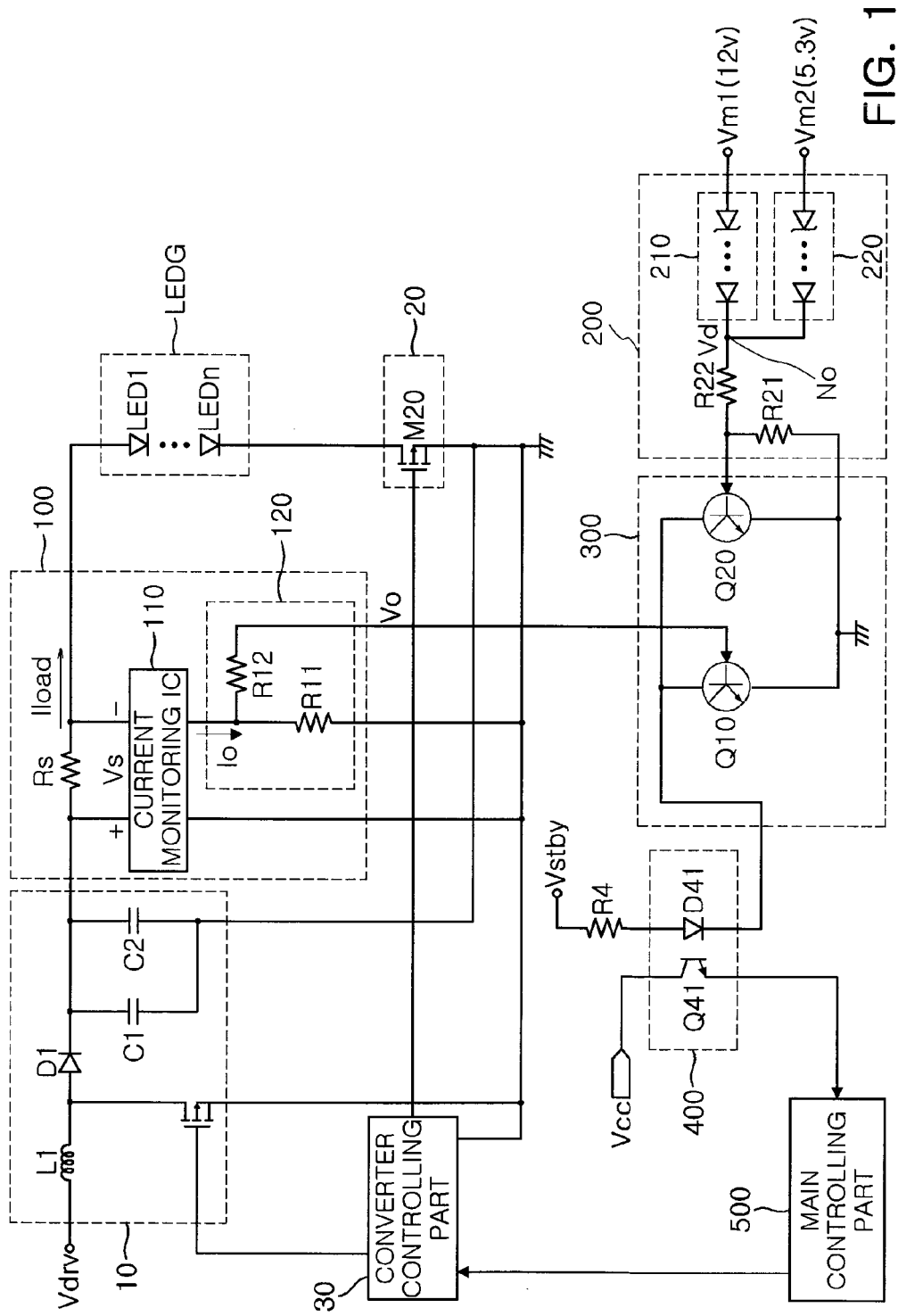
FIG. 1 is a block diagram illustrating an apparatus for driving a light emitting device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used to designate the same or like elements.

FIG. 1 is a block diagram illustrating an apparatus for driving a light emitting device according to an exemplary embodiment of the present invention.

With reference to FIG. 1, an apparatus for driving a light emitting device according to an exemplary embodiment of the invention may include a direct current/direct current (DC/DC) converter part 10, a constant current circuit part 20, a converter controlling part 30, a current sensing part 100, a feedback controlling part 300, an optical coupling part 400, a main controlling part 500. The DC/DC converter part 10 amplifies a preset driving voltage Vdrv and supplies the amplified driving voltage to a light emitting part LEDG including a plurality of light emitting devices. The constant current circuit part 20 controls a current flowing through the light emitting part LEDG. The converter controlling part 30 controls the DC/DC converter part 10 and the constant current circuit part 20. The current sensing part 100 senses a current flowing to an anode of the light emitting part LEDG and converts the sensed current into a voltage Vo. The feedback controlling part 300 controls a feedback current flowing from a standby terminal Vstby to a ground according to the magnitude of the voltage Vo supplied from the current sensing part 100. The optical coupling part 400 performs optical coupling with respect to the feedback current determined by the feedback controlling part 300 to transmit the feedback current as a feedback voltage. The main controlling part 500 determines whether an over-current is occurring according to the magnitude of the feedback voltage transmitted by the optical coupling part 400 and stops the operation of the converter controlling part 300 when it is determined that the over-current is occurring.

The light emitting part LEDG may include a plurality of light emitting diodes (LEDs), i.e., first to $n^{th}$ LEDs LED1 to LEDn as a light emitting device.

The DC/DC converter part 10 may be a boost converter including a coil L1, an MOSFET switch M1, a diode D1, and first and second capacitors C1 and C2.

The constant current circuit part 20 may include an MOS transistor M20 provided between a cathode of the light emitting part LEDG and the ground and operating according to the control of the converter controlling part 30, in order to constantly maintain the current flowing through the light emitting part LEDG.

Also, the apparatus for driving the light emitting device according to the present invention may include a voltage sensing part 200 sensing at least one multi-voltage.

The voltage sensing part 200 may sense first and second multi-voltages Vm1 and Vm2 having different magnitudes. To enable this, the voltage sensing part 200 may include a first sensing part 210, a second sensing part, and distribution circuits R21 and R22. The first sensing part 210 senses the first multi-voltage Vm1, and the second sensing part 220 is connected to the first sensing part 210 in parallel and senses the second multi-voltage Vm2. The distribution circuits R21 and R22 distribute a voltage at a common output node No of the first and second sensing parts 210 and 220 on the basis of a resistance ratio to supply a voltage Vd.

At this time, the feedback controlling part 300 may be configured to control the feedback current flowing from the standby terminal Vstby to the ground according to the magnitude of the voltage Vo from the current sensing part 100 and the magnitude of the voltage Vd from the voltage sensing part 200.

Figure 2:
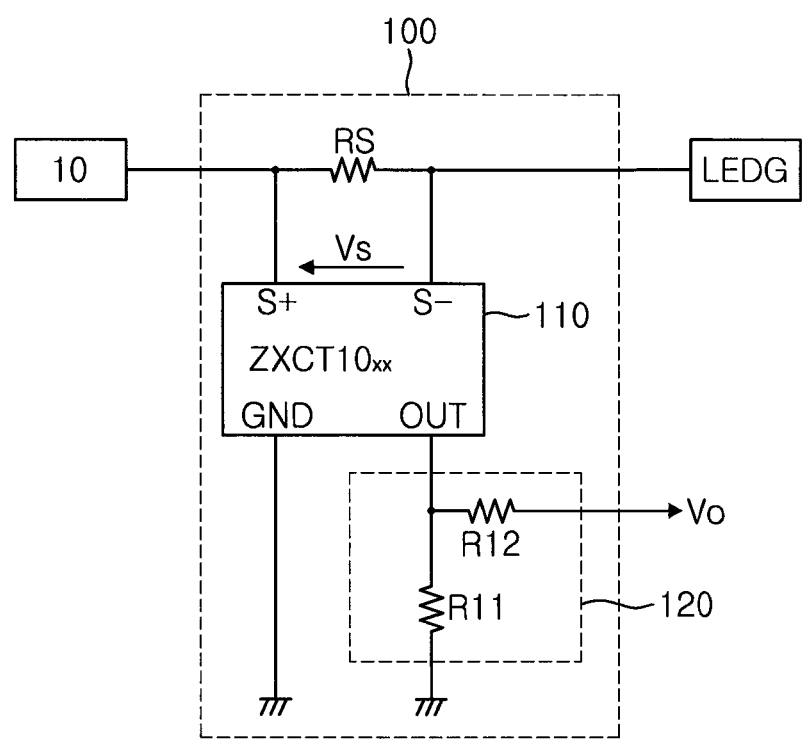
FIG. 2 is a circuit diagram of a current sensing part according to an exemplary embodiment of the present invention.

FIG. 2 is a circuit diagram of a current sensing part according to an exemplary embodiment of the present invention.

With reference to FIG. 2, the current sensing part 100 may include a sensing resistor Rs, a current monitoring integrated circuit (IC) 110, and a current/voltage converting part 120. The sensing resistor Rs is connected to a power line between the DC/DC converter part 10 and the anode of the light emitting part LEDG and senses a voltage Vs corresponding to a current Iload flowing to the anode of the light emitting part LEDG. The current monitoring integrated circuit IC 110 converts the voltage Vs sensed by the sensing resistor Rs into an output current Io. The current/voltage converting part 120 converts the output current Io of the current monitoring IC 110 into an output voltage Vo.

Here, the current monitoring IC 110 is capable of sensing tens of milliamperes (mA). For example, the 'ZXCT10xx' series made by Zetex Inc. may be employed as the current monitoring IC 110.

The feedback controlling part 300 may include a first electronic device Q10 controlling the feedback current flowing from the standby terminal Vstby to the ground according to the magnitude of the voltage Vo from the current sensing part 100.

Also, the feedback controlling part 300 may include a second electronic device Q20 connected in parallel with the first electronic device Q10 and controlling the feedback current flowing from the standby terminal Vstby to the ground according to the magnitude of the voltage Vd from the voltage sensing part 200.

The first electronic device Q10 may be a switching transistor, and the second electronic device Q20 may also be a switching transistor.

Hereinafter, the operations and effects of the present invention will be described with reference to the accompanying drawings.

In the description of the apparatus for driving the light emitting device according to the present invention with reference to FIGS. 1 and 2, the DC/DC converter part 10 amplifies a preset driving voltage Vdrv and supplies the amplified driving voltage to the anode of the light emitting part LEDG.

In the case that the light emitting part LEDG includes a plurality of LEDs LED1 to LEDn, the light emitting part LEDG is driven by the voltage supplied from the DC/DC converter part 10.

The constant current circuit part 20, connected between the cathode of the light emitting part LEDG and the ground, controls the current flowing through the light emitting part LEDG to be constant according to the control of the converter controlling part 30.

The converter controlling part 30 controls the DC/DC converter part 10 and the constant current circuit part 20 according to the control of the main controlling part 500.

Furthermore, in the case that the DC/DC converter part 10 is configured as the boost converter including the coil L1, the MOSFET switch M1, the diode D1, and the first and second capacitors C1 and C2, the MOSFET switch M1 boosts the driving voltage Vdrv according to the switching control of the converter controlling part 30.

The current sensing part 100 senses the current flowing to the anode of the light emitting part LEDG, converts the sensed current into the voltage Vo, and supplies the voltage Vo to the feedback controlling part 300.

The feedback controlling part 300 controls the feedback current flowing through an LED D41 of the optical coupling part 400 connected between the standby terminal Vstby and the ground according to the magnitude of the voltage Vo from the current sensing part 100.

Also, in the case that the apparatus for driving the light emitting device according to the present invention includes the voltage sensing part 200 sensing at least one multi-voltage, the feedback controlling part 300 may control the feedback current flowing from the standby terminal Vstby to the ground according to the magnitude of the voltage Vo from the current sensing part 100 and the magnitude of the voltage Vd from the voltage sensing part 200.

More specifically, the voltage sensing part 200 may include the first and second sensing parts 210 and 220 and the distribution circuits R21 and R22, in order to sense the first and second multi-voltages Vm1 and Vm2 having different magnitudes.

Herein, the first sensing part 210 senses the first multi-voltage Vm1, and the second sensing part 220 is connected to the first sensing part 210 in parallel and senses the second multi-voltage Vm2. The distribution circuits R21 and R22 distribute the voltage at the common output node No of the first and second sensing parts 210 and 220 on the basis of the resistance ratio to supply the voltage Vd.

Subsequently, the optical coupling part 400 performs the optical coupling between the LED D41 and a photo transistor Q41 with respect to the feedback current determined by the feedback controlling part 300 and transmits the feedback current as the feedback voltage to the main controlling part 500.

Then, the main controlling part 500 determines whether an over-current is occurring according to the magnitude of the feedback voltage transmitted by the optical coupling part 400 and stops the operation of the converter controlling part 30 when it is determined that the over-current is occurring.

In addition, the feedback controlling part 300 may control the feedback current flowing from the standby terminal Vstby to the ground according to the magnitude of the voltage Vo from the current sensing part 100 and the magnitude of the voltage Vd from the voltage sensing part 200.

The current sensing part 100 will be described with reference to FIG. 2.

With reference to FIG. 2, the sensing resistor Rs of the current sensing part 100 is connected to the power line between the DC/DC converter part 10 and the anode of the light emitting part LEDG, senses the voltage Vs corresponding to the current Iload flowing to the anode of the light emitting part LEDG, and supplies the voltage Vs to the current monitoring IC 110.

The current monitoring IC 110 converts the voltage Vs sensed by the sensing resistor Rs into the output current Io and supplies the output current Io to the current/voltage converting part 120.

The current/voltage converting part 120 converts the output current Io of the current monitoring IC 110 into the output voltage Vo and supplies the output voltage Vo to the feedback controlling part 300.

For example, the current monitoring IC 110 is an IC capable of sensing tens of milliamperes (mA). For example, the 'ZXCT10xx' series made by Zetex Inc. may be employed as the current monitoring IC 110.

In the case that the resistance value of the sensing resistor Rs of the current sensing part 100 is set to 33.5 mΩ and the current Iload flowing to the anode of the light emitting part LEDG is set to 5 A, the voltage Vs sensed by the sensing resistor Rs is approximately 0.165V obtained by 5 (Iload)× 0.033 (Rs).

Here, in the case that the internal transconductance GT of the current monitoring IC 110 is set to 0.01, the output voltage Io outputted from the current monitoring IC 110 is approximately 1.65 mA obtained by 0.01 (GT)×0.165 (Vs).

Then, in the case that the resistance R11 of the current/voltage converting part 120 is set to 3.03 kΩ, the output voltage Vo outputted from the current/voltage converting part 120 is approximately 5V obtained by 3.03 kΩ×1.65 mA.

Also, the first electronic device Q10 of the feedback controlling part 300 may control the feedback current flowing from the standby terminal Vstby to the ground according to the magnitude of the voltage Vo from the current sensing part 100.

Alternatively, the second electronic device Q20 of the feedback controlling part 300 may control the feedback current flowing from the standby terminal Vstby to the ground according to the magnitude of the voltage Vd from the voltage sensing part 200.

Particularly, in the case that the first and second electronic devices Q10 and Q20 are configured as switching transistors, the first and second electronic devices Q10 and Q20 are configured to turn on at the time of over-current and over-voltage. At this time, if the main controlling part 500 receives the voltage inputted from the optical coupling part 400, the main controlling part 500 determines that an over-voltage or over-current is occurring and stops the operation of the converter controlling part 30, accordingly stopping the operation of the apparatus for driving the light Emitting device.

According to the present invention as described above, the internal circuit and components may be protected from over-current and over-voltage.

As set forth above, in an apparatus for driving a light emitting device according to exemplary embodiments of the invention, the internal circuit and components thereof may be protected from over-voltage as well as over-current in which current flowing through a chain of light emitting devices minutely changes in the case that a central light emitting device in the chain including a plurality of series-connected light emitting devices such as LEDs is connected to the ground.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for driving a light emitting device comprising:
   a direct current/direct current (DC/DC) converter part amplifying a preset driving voltage and supplying the amplified driving voltage to a light emitting part including a plurality of light emitting devices;
   a constant current circuit part controlling a current flowing through the light emitting part;
   a converter controlling part controlling the DC/DC converter part and the constant current circuit part;
   a current sensing part sensing a current flowing to an anode of the light emitting part and converting the sensed current into a voltage;

a feedback controlling part controlling a feedback current flowing from a standby terminal to a ground according to a magnitude of the voltage from the current sensing part;

an optical coupling part performing optical coupling with respect to the feedback current determined by the feedback controlling part to transmit the feedback current as a feedback voltage; and a main controlling part determining whether an over-current is occurring according to a magnitude of the feedback voltage transmitted by the optical coupling part and stopping an operation of the converter controlling part when the over-current is occurring.

2. The apparatus of claim 1, wherein the current sensing part comprises:

a sensing resistor connected to a power line between the DC/DC converter part and the anode of the light emitting part and sensing a voltage corresponding to the current flowing to the anode of the light emitting part;

a current monitoring integrated circuit converting the voltage sensed by the sensing resistor into an output current; and a current/voltage converting part converting the output current of the current monitoring integrated circuit into an output voltage.

3. The apparatus of claim 2, wherein the feedback controlling part comprises a first electronic device controlling the feedback current flowing from the standby terminal to the ground according to the magnitude of the voltage from the current sensing part.

4. The apparatus of claim 3, wherein the first electronic device is a switching transistor.

5. An apparatus for driving a light emitting device comprising:

a direct current/direct current (DC/DC) converter part amplifying a preset driving voltage and supplying the amplified driving voltage to a light emitting part including a plurality of light emitting devices;

a constant current circuit part controlling a current flowing through the light emitting part;

a converter controlling part controlling the DC/DC converter part and the constant current circuit part;

a current sensing part sensing a current flowing to an anode of the light emitting part and converting the sensed current into a voltage;

a voltage sensing part sensing at least one multi-voltage;

a feedback controlling part controlling a feedback current flowing from a standby terminal to a ground according to a magnitude of the voltage from the current sensing part and a magnitude of the voltage from the voltage sensing part;

an optical coupling part performing optical coupling with respect to the feedback current determined by the feedback controlling part to transmit the feedback current as a feedback voltage; and a main controlling part determining whether an over-current is occurring according to a magnitude of the feedback voltage transmitted by the optical coupling part and stopping an operation of the converter controlling part when the over-current is occurring.

6. The apparatus of claim 5, wherein the current sensing part comprises:

a sensing resistor connected to a power line between the DC/DC converter part and the anode of the light emitting part and sensing a voltage corresponding to the current flowing to the anode of the light emitting part;

a current monitoring integrated circuit converting the voltage sensed by the sensing resistor into an output current; and a current/voltage converting part converting the output current of the current monitoring integrated circuit into an output voltage.

7. The apparatus of claim 6, wherein the feedback controlling part comprises:

a first electronic device controlling the feedback current flowing from the standby terminal to the ground according to the magnitude of the voltage from the current sensing part; and a second electronic device connected in parallel with the first electronic device and controlling the feedback current flowing from the standby terminal to the ground according to the magnitude of the voltage from the voltage sensing part.

8. The apparatus of claim 7, wherein the first electronic device is a switching transistor.

9. The apparatus of claim 7, wherein the second electronic device is a switching transistor.

* * * * *